United States Patent
Suh et al.

(10) Patent No.: US 6,355,219 B2
(45) Date of Patent: Mar. 12, 2002

(54) NICKEL-ALUMINA AEROGEL CATALYST FOR CARBON DIOXIDE REFORMING OF METHANE AND THE PREPARATION METHOD THEREOF

(75) Inventors: Dong Jin Suh; Tae Jin Park; Young Hyun Yoon; Jin Hong Kim, all of Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/747,101

(22) Filed: Dec. 21, 2000

Related U.S. Application Data

(62) Division of application No. 09/226,182, filed on Jan. 5, 1999, now Pat. No. 6,271,170.

(30) Foreign Application Priority Data

Mar. 17, 1998 (KR) .............................. 98-9087

(51) Int. Cl.⁷ .......................... C01B 31/18; C01B 3/02; C01B 3/32; C01B 3/38
(52) U.S. Cl. ................. 423/224; 423/220; 423/230; 423/418.2; 423/648.1; 423/650; 423/651; 423/658.2
(58) Field of Search ................. 423/220, 224, 423/230, 418.2, 648.1, 650, 651, 658.2

(56) References Cited

U.S. PATENT DOCUMENTS 3,849,087 A 11/1974 Arakawa et al.
3,963,646 A * 6/1976 Teichner et al.

OTHER PUBLICATIONS

Yasuyuki Mizushima, Makoto Hori, Properties of alumina aerogels prepared under different conditions, Journal of Non–Crystalline Solids 167 (1994) 1–8, No month.

Bulent E. Yoldas, Alumina gels that form porous transpatent $Al_2O_3$, Journal of Materials Science 10 (1975) 1856–1860, No month.

Z.L. Zhang, X.E. Verykios, Carbon dioxide reforming of methane to synthesis gas over supported Ni catalysts, Catalysts Today 21 (1994) 589–595, No month.

H.C. Dibbern, P. Olesen, J.R. Rostrup–Nielsen, P.B. Tottrup, N.R. Udengaard, Make Iow $H_2$/CO syngas using sulfur passivated reforming, Hydrocarbon Processing, Jan. 1986, 71–74.

A.T. Ashcroft, A.K. Cheetham, M.L.H. Green, P.D.F. Vernon,, Partial oxidation of methane to synthesis gas using carbon dioxide, Nature vol. 352, Jul. 18, 1991, 225–226.

* cited by examiner

*Primary Examiner*—Elizabeth D. Wood
(74) *Attorney, Agent, or Firm*—Darby & Darby

(57) ABSTRACT

The present invention relates to a method of containing nickel into the alumina aerogel prepared by sol-gel method and supercritical drying and of preparing the nickel-alumina hybrid aerogel catalyst. The nickel-alumina catalyst prepared in the present invention has an excellent reactivity with a prolonged lifetime.

1 Claim, No Drawings

NICKEL-ALUMINA AEROGEL CATALYST FOR CARBON DIOXIDE REFORMING OF METHANE AND THE PREPARATION METHOD THEREOF

This is a division of application Ser. No. 09/226,182, filed Jan. 5, 1999, now U.S. Pat. No. 6,271,170, which is hereby incorporated herein by reference, in its entirety.

BACKGROUND OF THE INVENTION

The present invention relates to a method of preparing highly reactive nickel catalysts with an increased lifespan that are used in preparing synthesis gas by reforming methane, a main component in natural gas, with carbon dioxide. More particularly, the present invention relates to a method of preparing nickel-alumina hybrid aerogel catalyst by using a sol-gel method or by having alumina aerogel to carry nickel thereon, in a different manner than the prior nickel catalyst supported on alumina.

Generally, an aerogel is prepared by supercritically drying a gel from a sol-gel reaction. The aerogel has a specific high surface area ratio with a low density. Due to its physical characteristics, aerogel is useful as a catalyst or can be used as a carrier for a catalyst. Supercritical drying is a process of drying the gel above a critical state such as high temperature and high pressure to remove solvents held in the gel structures. By this method, it is possible to prevent shrinkage and crack formation due to capillary pressure differences between the gas/liquid phase interface.

Carbon dioxide is considered to be relatively harmless. However, it has been recently revealed as a major factor in global warming, and its production is now restricted by climate control regulation. Therefore, people are now more interested in reducing carbon dioxide production or in developing physical and chemical methods to fix carbon dioxide.

One of the chemical methods used in fixing carbon dioxide is to produce a mixture containing carbon monoxide and hydrogen by reforming methane, a major component in natural gas, with carbon dioxide as shown below. The produced mixture can be utilized in generating a variety of chemicals. This is one of the more effective ways of utilizing the natural gas, which is used mainly as a fuel. It is practically useful to use methane and carbon dioxide simultaneously, considering that methane has a higher global-warming tendency than carbon dioxide and when it is inconvenient to transport the methane, it is wasted by burning it in-situ, which produces undesirable carbon dioxide.

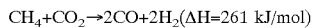

$$CH_4 + CO_2 \rightarrow 2CO + 2H_2 (\Delta H = 261 \text{ kJ/mol})$$

The synthesis gas or "syngas" produced by the reaction above has a carbon monoxide/hydrogen ration of 1:1 and can be used as a starting material for many chemicals. The purity of the produced carbon monoxide is known to be higher than that produced by any other methods. This reaction characteristic is similar to the conversion method using steam in producing hydrogen gas, and therefore already established processes and knowledge in the field can be utilized. A durable catalyst is urgently needed to be developed since catalyst can be easily deactivated due to coking during the reaction when the commercial nickel catalyst for the steam reforming is used.

According to the literature, the deactivation of the noble metal catalyst is markedly slow (A. T. Ashcroft, A. K. Cheetham, M. L. H. Green, and P. D. F. Vernon, *Nature*, 225, 352 (1991)). Considering the economical aspect, however, it is impractical to use the noble metal catalysts when a large amount of catalyst is needed. Therefore, there have been many studies to improve the durability of the nickel catalyst by using a co-catalyst or additives.

In the commercialized SPARG process, nickel catalyst treated with sulfur is used to improve the durability. In this process, however, there are many problems such as the sulfur must be supplied continuously to the reaction mixture and the reaction needs to be carried out at a temperature higher than 900° C. to improve the reactivity of the catalyst [H. C. Dibbern, P. Olesen, J. R. Rostrup-Nielsen, P. B. Tottrup, and N. R. Udengaard, Hydrocarbon Process., 65, 71 (1986)]. The deactivation of the catalyst can be reduced by adding vanadium or molybdenum into the nickel catalyst [T. Arakawa and M. Oka, U.S. Pat. No. 3,849,087], by adding a basic material such as calcium oxide [Z. L. Zhang and X. E. Verykios, Catal. Today 21, 589 (1994)] or by using basic magnesium oxide that can contain the catalysts.

BRIEF SUMMARY OF THE INVENTION

It is an object of the present invention to provide a durable catalyst free from deactivation problems due to coking. The catalyst of the present invention is useful in the process of simultaneous treatment of methane and carbon dioxide which are major contributors of global-warming and is different from a prior nickel catalyst for steam reforming.

More particularly, it is an object of the present invention to provide a highly reactive nickel catalyst with an increased lifespan that is used in preparing a synthesis gas by reforming methane, a main component in natural gas, with carbon dioxide. That is, the present invention relates to a method of preparing nickel-alumina hybrid aerogel catalyst by using a sol-gel method or by having alumina aerogel to carry nickel thereon, in a different manner than the prior nickel catalyst supported on alumina.

DETAILED DESCRIPTION OF THE INVENTION

One of the simplest processes for preparing alumina gel is the hydrolysis of aluminum alkoxide using an acid catalyst and excess amount of water. In this case, it is required to exchange water with another solvent such as alcohol to prepare the aerogel by supercritical drying [B. E. Yoldas, J. Mater. Sci., 10, 1856 (1975)]. In the case of using an organic solvent such as benzene or alcohol, it takes several days to synthesize gels even at high temperatures, and therefore, an additive to accelerate the sol-gel reaction is often used [Y. Mizushima and M. Hori, J. Non Cryst. Solids, 167, 1 (1994)]. However, in the sol-gel method of the present invention, a homogeneous alumina gel can be synthesized at room temperatures without additives by slightly altering the solubilization, hydrolysis and condensation processes.

A detailed description of the preparation method of the alumina or the nickel-alumina hybrid aerogel by using the sol-gel method follows.

The preparation method of the alumina or the nickel-alumina hybrid aerogel of the present invention is composed of: the step of dissolving aluminum alkoxide in a heated alcoholic solvent; the step of forming a transparent sol by partial hydrolysis; the step of forming a gel at room temperature; the step of aging the gel; the step of supercritically drying the gel; and the step of thermally treating the gel.

The first step of dissolving aluminum alkoxide involves adding aluminum alkoxide into a heated alcoholic solvent and vigorously stirring it for dissolution. The aluminum alkoxides represented by $Al(OR)_3$ (R is an alkyl with 1 to 6 carbons), preferably aluminum isopropoxide or aluminum sec-butoxide, can be used for this process. Any kind of alcohol, preferably ethanol or 1-propanol, can be used. The ratio between the alcohol and alkoxide is preferably 0.4 to 0.6 mmol/ml, and the temperature of the heated alcohol is preferably 40 to 90° C.

The second step of forming a transparent sol by a partial hydrolysis involves adding the heated alcohol solution with aluminum alkoxide into a mixture of acid, water and alcohol in a single step, and stirring while heating the solution continuously to form a transparent sol by partial hydrolysis. There is no limit to the amount of alcohol used for this step, however, it is preferable to use ⅓ to ⅔ of the amount that was used for the first step. It is also preferable to use water in a mole ratio of 0.2 to 0.8 based on aluminum. It is preferable to use acid in a mole ratio of 0.01 to 1.0 based on aluminum. For instance, in the case of nitric acid, it is preferable to use the nitric acid in the amount of ¹⁄₅₀ to ¹⁄₁₀₀ in a molar ratio based on aluminum.

In the case of forming a nickel-alumina hybrid gel, completely dissolved alcohol solution containing nickel as a salt form at a 0.03 to 0.3 mole ratio to the total amount of aluminum is added. There is no limit to the amount of alcohol used for this step, however, it is preferable to use 0.05 to 0.2 of the amount that was used for the step of forming the transparent gel by partial hydrolysis. Any nickel salt that dissolves well in alcohol, preferably nickel nitrate or nickel acetate can be used.

The third step of forming a gel at room temperature involves cooling the transparent sol prepared in the second step and of adding an alcohol that contains a certain amount of water to form a transparent homogeneous gel in a few minutes. It is preferable to use water in the mole ratio of 0.5~1.5 based on aluminum.

The fourth step involves aging the gel formed at the third step for more than 1 hour.

The fifth step of supercritical drying the gel involves incubating the aged gel at a higher than the critical pressure and temperature of the alcoholic solvent and changing the condition to room temperature at atmospheric pressure. Supercritical drying can also be performed by replacing the solvent with carbon dioxide and by supplying carbon dioxide at the supercritical condition as above to completely remove the alcohol to form an aerogel.

The sixth step of thermal treating the gel involves initially thermal treating the gel at an inert atmosphere at 200 to 500° C. and a secondary thermal treating in air or oxygen atmosphere at higher than 500° C. The thermally treated alumina aerogel can be used as a support for carrying the nickel. The nickel-alumina hybrid gel, which went through the second step of adding the transparent sol into the alcohol solution which contains the completely dissolved nickel salt and through the third through the sixth step, can be used as a catalyst for the reforming reaction of methane with carbon dioxide. The increasing temperature rate is 1 to 20° C./min for all the processes.

As described above, a synthesis gas is produced by using the catalysts prepared in the present invention. In this case, by using a conventional fixed-bed atmospheric flow reactor, first the hydrogen is supplied into the catalyst bed, then the hydrogen supply is terminated and nitrogen is added to purge the hydrogen. The methane and carbon dioxide reactants are supplied with nitrogen continuously to produce the synthesis gas. The gas contact time in the catalyst bed during the pretreatment and reaction is 0.0005 to 0.005 $g.min.1^{-1}$, and the composition of the reactant is 15 to 30% methane, 15 to 30% carbon dioxide and nitrogen balanced to 100%.

The invention will be further illustrated by the following examples, but the present invention is not limited to the examples given.

EXAMPLE 1

12.32 g of aluminum sec-butoxide was added to 47.4 g (60 cc) of ethanol at 60° C. vigorously stirred to dissolve the mixture completely and the mixed solution of 0.2044 g of 60% nitric acid, 31.6 g (40 cc) of ethanol and 0.45 g of water was added to form a transparent sol. After cooling this transparent sol to room temperature, a mixed solution of 3.95 g (5 cc) of ethanol and 1.0 g of water was added to form a transparent homogeneous alumina gel in 2 minutes. After the gel was aged for 3 hours in a closed state, the aged gel was transferred to a vessel for supercritical drying. Carbon dioxide was then introduced at 60° C., 240 atm. for supercritical drying to form an alumina aerogel. The aerogel was treated for 2 hours at 300° C. at a 135 ml/min helium atmosphere with the temperature increasing at a rate of 5° C./min up to 300° C. for the initial thermal treatment. The aerogel was then calcined for 2 hours at 500° C. after increasing the temperature with an increasing rate of 5° C./min for the secondary thermal treatment.

In order to carry the nickel on the prepared alumina aerogel, 10 g of alumina aerogel was added into an aqueous solution containing 2.285 g of nickel nitrate and 30 cc of distilled water and heated to 80° C. while stirring well to obtain a slurry mixture. After drying the mixture in an oven at 120° C. for about 12 hours, a thermal treatment was performed for 2 hours at 500° C. in a 95 ml/min oxygen atmosphere to form a nickel catalyst contained in an alumina aerogel.

The reactivity of the catalyst was measured by using a fixed-bed atmospheric flow reactor. The catalyst (0.05 g) as prepared above was put into a reaction tube and a pretreatment was performed for 2 hours at 700° C. while hydrogen and nitrogen at 10 and 20 ml/min, respectively, were supplied. After the pretreatment, the hydrogen supply was terminated and nitrogen was provided for another 5 minutes to purge the hydrogen before the reactants, methane and carbon dioxide, were supplied. The flow rates of the gases were 10,10 and 20 ml/min, respectively, and the reaction temperature was 700° C. which was identical to the temperature during the pretreatment. The composition of the product was identified by using gas chromatography, and the conversion of methane and carbon dioxide was calculated.

The result of the reactivity measurement of the nickel catalyst contained in alumina aerogel is summarized in Table 1. The conversion of methane and carbon dioxide was 68% and 70%, respectively, in 2 hours after the initiation of the reaction at 700° C. and decreased to 62% and 64%, respectively, 30 hours after the reaction. The decrease in rate, however, was not high.

Since it is known that the decrease of the catalyst reactivity is mainly from coking, the carbon contents before and after the reaction were measured and the results summarized in Table 2. As can be seen in the Table, coking was not a problem since the carbon content was extremely low even after 30 hours. Considering the carbon content in the aerogel itself, the deposited carbon during the reaction is lower than the listed values in Table 2.

Comparative Example 1

Using the alumina catalyst carrying nickel as in EXAMPLE 1 in alumina that is conventionally used as a catalyst carrier, the reactivity of the reforming reaction of methane with carbon dioxide was measured. As can be seen in Table 1, the conversions were 66 and 68%, respectively, in 2 hours after the initiation of the reaction. After 3 hours, however, the conversion decreased dramatically due to coking. As can be seen in Table 2, the carbon content 3 hours after the initiation of the reaction was 11.20%, which indicates severe coking.

Comparative Example 2

Commercial catalyst from the Engelhard Co. (ESCAT44) that contains 5% of a precious metal ruthenium in alumina was used to measure the reactivity at an identical condition as in EXAMPLE 1. As can be seen in Table 1, the conversion rates were 72% and 74%, respectively, in 2 hours and 71% and 72%, respectively, in 30 hours after the initiation of the reaction. The reactivity obtained using the precious metal catalyst is similar to the results as in EXAMPLE 1.

EXAMPLE 2

Different from EXAMPLE 1, during the alumina formation by using the sol-gel method, nickel nitrate (Ni(NO$_3$)$_2$.6H$_2$O) was added to form a nickel-alumina hybrid aerogel as follows. In other words, as in EXAMPLE 1, after a transparent sol was formed with ethanol, aluminum sec-butoxide, nitric acid and water, the temperature was decreased to 60° C. before adding 7.9 g (100 cc) of ethanol solution containing 1.454 g of nickel nitrate. After enough time had passed to form a homogeneous solution, the temperature was decreased to room temperature, and 3.95 g (5 cc) of ethanol and 1.0 g of water were added to form a nickel-alumina hybrid gel. The prepared gel was supercritical-dried as in EXAMPLE 1, thermal-treated and used as a catalyst to measure the reactivity. The results of the reactivity and the carbon content measurements are listed in Tables 1 and 2. As can be seen from the Tables, the reactivity is a little lower and the carbon content is a little higher than those in EXAMPLE 1. However, the coking and deactivation of the catalyst were considerably lower than those in COMPARATIVE EXAMPLE 1.

EXAMPLE 3

In preparing the catalyst as described in EXAMPLE 2, nickel acetate was used as a nickel salt instead of nickel nitrate to prepare a nickel-alumina hybrid aerogel. As can be seen in Tables 1 and 2, this catalyst has similar reactivity to the catalyst in EXAMPLE 2, while showing extremely low coking.

TABLE 1

Changes in conversion of methane according to the catalyst and the reaction time

| Reaction time | COMPARATIVE EXAMPLE 1* | EXAMPLE 1 | EXAMPLE 2 | EXAMPLE 3 | COMPARATIVE EXAMPLE 3 |
|---|---|---|---|---|---|
| Methane conversion (%) | | | | | |
| 2 h | 66 | 68 | 62 | 61 | 72 |
| 30 h | — | 62 | 52 | 47 | 71 |
| Carbon dioxide conversion (%) | | | | | |
| 2 h | 68 | 70 | 64 | 66 | 74 |
| 30 h | — | 64 | 53 | 54 | 72 |

*Reaction was terminated in 3 hours due to plugging the reactor tube.

TABLE 2

Changes in carbon content according to the catalyst and the reaction time

| | COMPARATIVE EXAMPLE 1* | EXAMPLE 1 | EXAMPLE 2 | EXAMPLE 3 | COMPARATIVE EXAMPLE 3 |
|---|---|---|---|---|---|
| Before reaction (700° C., hydrogen treatment only) | – | 0.30 | 0.51 | 0.54 | — |
| After reaction (700° C., hydrogen treatment and reaction) | 11.20* | 0.97 | 2.08 | 0.78 | 0.25 |

The nickel-alumina catalyst prepared in the present invention was used in the reforming reaction of methane with carbon dioxide. The catalyst of the present invention is highly reactive with an increased lifespan. The sol-gel method used in the present invention is advantageous since the homogeneous gel can be obtained by simple methods in a short time unlike the conventional alumina gel synthesis.

What is claimed is:

1. A method of producing synthesis gas which comprises reacting 15~30% methane, 15~30% carbon dioxide and remaining amount to 100% of nitrogen at a reaction temperature of 600~800° C., with a contact time of 0.0005~0.005 g min $l^{-1}$ in the presence of a nickel-alumina aerogel catalyst for reforming methane with carbon dioxide comprising 1–40% nickel and 60–99% alumina.

* * * * *